United States Patent [19]

Howard

[11] Patent Number: 5,096,006

[45] Date of Patent: Mar. 17, 1992

[54] APPARATUS FOR STORING CHLORINE GAS

[76] Inventor: Chris Howard, 3665 Loyola Ct., Merced, Calif. 95348

[21] Appl. No.: 665,367

[22] Filed: Mar. 5, 1991

[51] Int. Cl.⁵ .................... G01G 19/02; B65D 88/76
[52] U.S. Cl. ................................. 177/134; 220/484
[58] Field of Search ................. 177/134, 132; 220/484

[56] References Cited

U.S. PATENT DOCUMENTS

| | | |
|---|---|---|
| 3,401,116 | 9/1968 | Stanwood . |
| 3,465,527 | 9/1969 | Rohmer . |
| 3,507,120 | 4/1970 | Rohmer . |
| 3,650,405 | 3/1972 | Morrison . |
| 4,542,626 | 9/1985 | Colin . |
| 4,630,697 | 12/1986 | Hartman et al. .................... 177/211 |
| 4,657,095 | 4/1987 | Hardin, Jr. et al. ................ 177/132 |
| 4,911,326 | 3/1990 | McGouran, Jr. ................... 220/445 |

Primary Examiner—George H. Miller, Jr.
Attorney, Agent, or Firm—Poms, Smith, Lande & Rose

[57] ABSTRACT

Apparatus for storing chlorine gas in a containment vessel disposed underground is provided. The gas is stored in a conventional cylinder which is lifted into and out of the vessel by a rack having a bail at top for lifting the rack. A scale is mounted in the vessel and the rack rests on top of the scale. Above ground valve apparatus closes off the vessel and suitable vacuum and vent lines are associated with a regulator mounted at top of the cylinder.

11 Claims, 2 Drawing Sheets

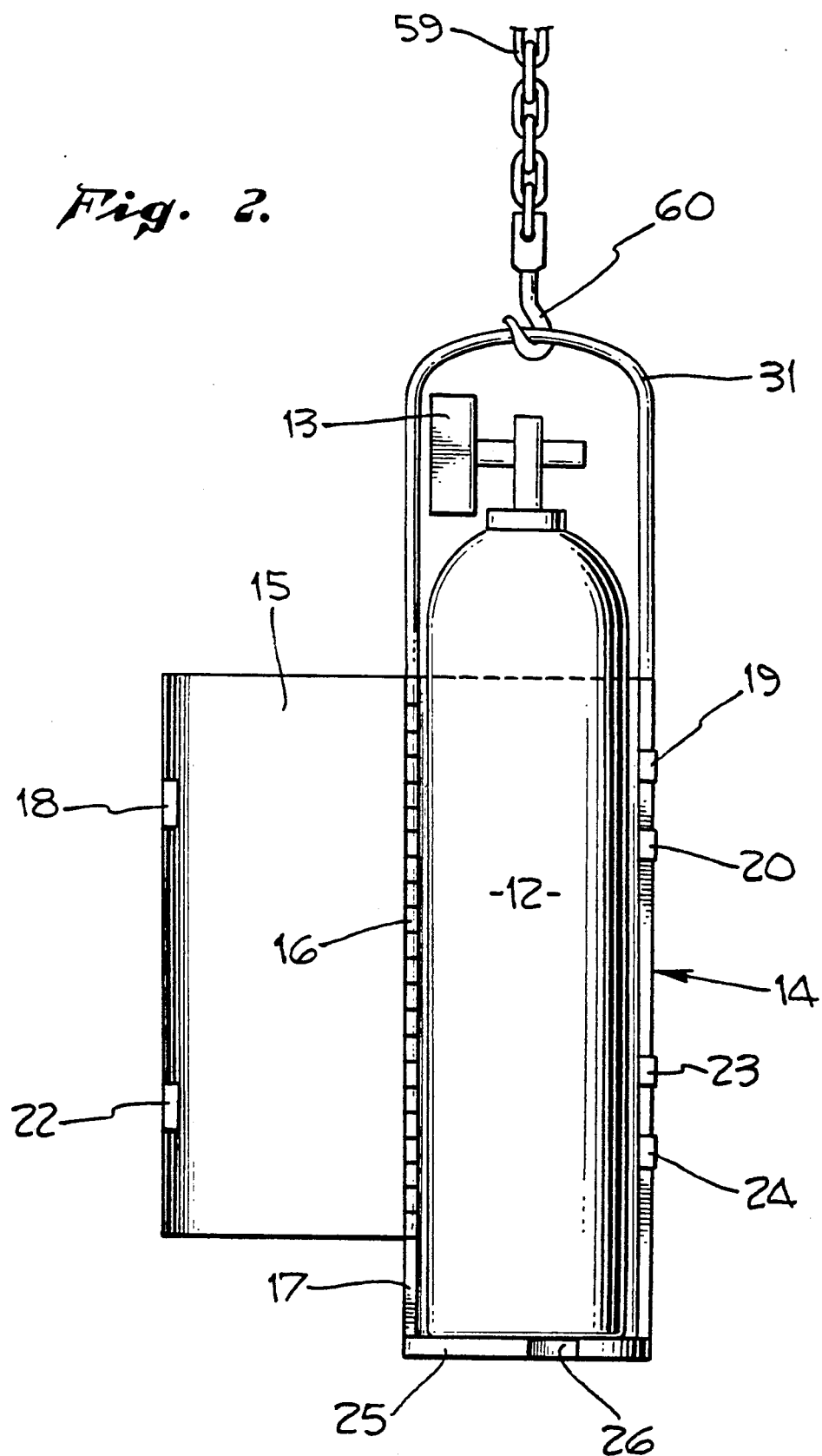

APPARATUS FOR STORING CHLORINE GAS

BACKGROUND OF THE INVENTION

1. Field of the Invention

The invention relates to apparatus for storing chlorine gas; and, more particularly, to an underground containment vessel having a gas cylinder mounted therein.

2. Description of the Prior Art

Various methods and techniques are used to store chlorine gas. Chlorine gas is commonly used to disinfect water. Such gas is quite toxic, corrosive, and extreme care must be taken in storing such gas. Generally, conventional above ground storage is used. However, leakage of gas from such above ground storage is a constant and potentially lethal problem. Elaborate gas scrubbers and ventilation systems must be used, particularly where there is a danger to residential and commercial users. Further, such above ground installations are quite unsightly and may need to be disguised in buildings. This makes repairs and retrofiting difficult. A break in a feed line of such conventional chlorine gas above ground storage systems can damage sensitive electrical equipment and materials. Further, such systems are exposed to the elements and can be damaged by sunlight, fire, etc.

As a general rule, chlorine is supplied in the liquid state, confined under pressure, in various size steel cylinders containing up to 150 pounds of liquid chemical. Chlorine is also available in ton containers holding 2000 pounds of liquid chemical. The chlorine containers are required by law to be protected against rupture in the event of severe overheating. This requirement is met by the use of fusible metal plugs which melt between 158° F. and 165° F. to allow the contents of the container to discharge to atmosphere. Cylinders are protected by a single fusible plug (either of the poured or screwed type) located in the valve body. Ton containers are protected by fusible plugs (screwed type only) located in each end of the container.

There is thus a need for apparatus for storing chlorine gas in a safe manner underground where the cylinder containing the gas can be easily lifted into or out of the underground storage facility.

SUMMARY OF THE INVENTION

It is an object of this invention to provide apparatus for storing chlorine gas underground.

It is a further object of this invention to carry out the foregoing object wherein a cylinder containing the gas can be easily lifted into or out of the underground storage apparatus.

It is still further an object of this invention to provide for the safe containment of chlorine gas underground.

These and other objects are preferably accomplished by storaging cylinders containing chlorine gas in a containment vessel disposed underground. The gas cylinder can be lifted into and out of the vessel by a rack having a bail at the top for lifting the rack. A scale is mounted in the vessel and the rack rests on top of the scale. Above ground valve apparatus closes off the vessel and suitable vacuum and vent lines are associated with a regulator mounted at top of the cylinder.

BRIEF DESCRIPTION OF THE DRAWING

FIG. 2 is a side elevational view, also partly in cross-section, of the lifting apparatus of FIG. 1.

DESCRIPTION OF THE PREFERRED EMBODIMENT

Figure 1:
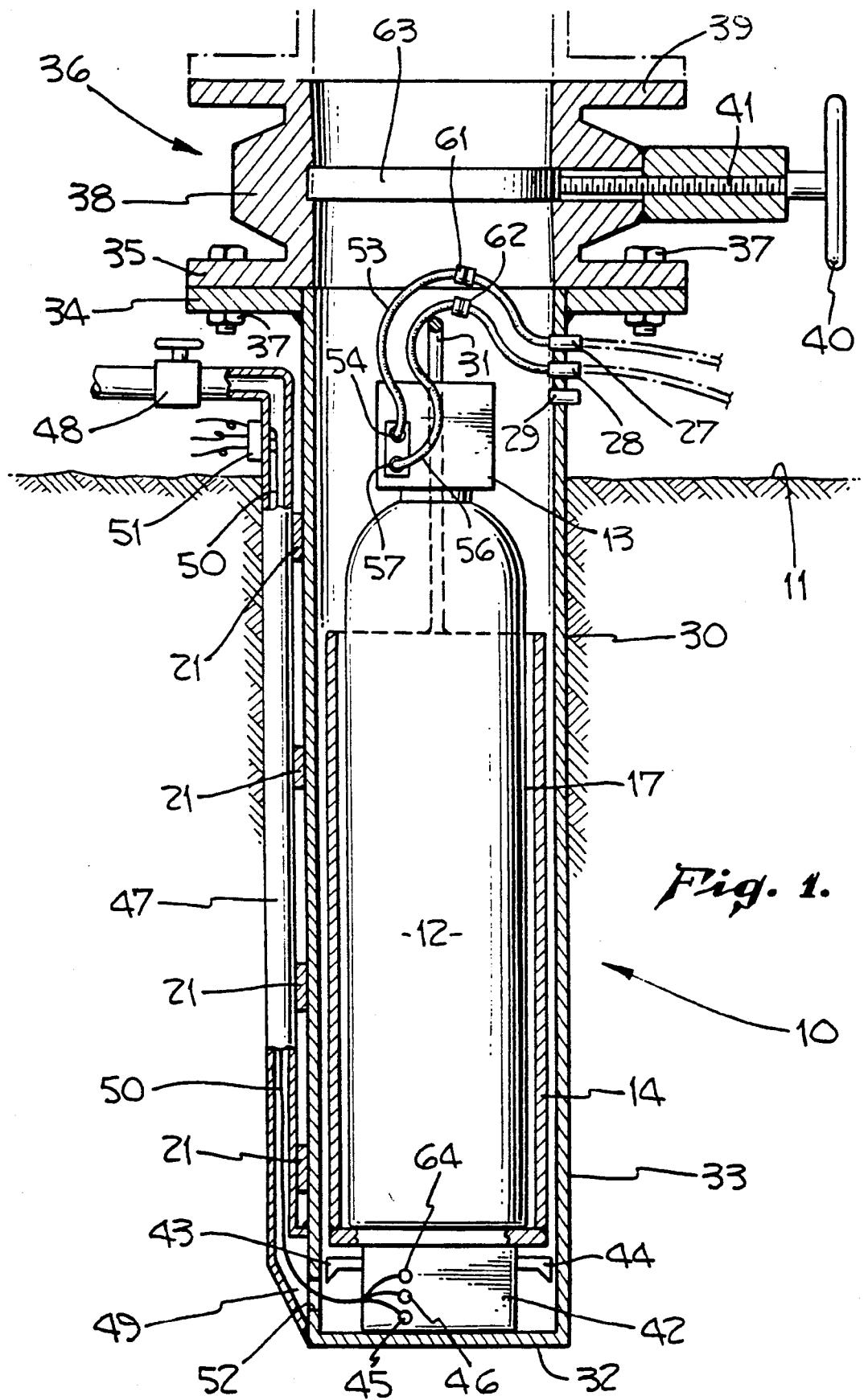
FIG. 1 is an elevational view, partly in cross-section, of underground storage apparatus in accordance with the teachings of the invention.

Referring now to FIG. 1 of the drawing, apparatus 10 for storing chlorine gas underground is shown disposed underground (i.e., having a substantial portion below ground level 11). Chlorine gas is contained in a cylinder 12, such as a 150 pound cylinder, the overall weight of the chlorine gas and cylinder being about 250 pounds. Such a cylinder 12 may have a diameter of about 10.75 inches and hold a maximum charge of about 100 to 150 pounds.

Cylinder 12 is provided with a conventional vacuum regulator 13 screwed thereto at the top thereof having suitable shut-down means in case of breakage in the feed line, as will be discussed. A cylinder carriage or lifting rack 14 extends under the bottom and up the sides of cylinder 12 terminating at its upper end in a curved top or bail 31. As seen in FIG. 2, rack 14 has a main cylindrical body portion 17 having a door 15 hinged via piano hinge 16 thereto. Door 15 can thus be swung to close off an opening leading into rack 14 and has a first upper part 18 of a conventional hinge pin assembly adapted to mate with a pair of spaced upper second parts 19, 20 of a conventional hinge pin assembly on body portion 17. In like manner, a first lower hinge pin assembly part 22 on door 15 is adapted to mate with spaced lower hinged pin assembly parts 23, 24 on body portion 17. Thus, door 15 can be locked and cylinder 12 won't fall out when rack 14 is lifted out of vessel 30, as will be discussed.

The base 25 of rack 14 is notched as at notch 26. This provides clearance of the nipples 27, 28, 29 (FIG. 1) on the containment vessel 30 when rack 14 is withdrawn out of vessel 30, as will be discussed. The spacing between cylinder 12 and rack 14 may be about ¼ inches therearound. Door 15 may be of sheet metal or any other suitable material.

Cylinder 12 may be about 54 inches from the bottom to the top of regulator 13. Thus, rack 14 may be about 5½ inches from uppermost portion of curved or bail 31 to the lowermost portion of base 25 (base 25 being about ½ inches thick).

Containment vessel 30 (FIG. 1) has a base 32 with an upper cylindrical wall 33. The thickness of wall 33 is such so as to be able to contain the working pressure of the cylinder 12, e.g., 150 lbs. A containment vessel test pressure must be a minimum of 250 psi. Any suitable materials may be used, such as heavy duty plastic, stainless steel, etc. One preferred material is carbon steel with a fusion coated epoxy finish for corrosion resistance.

Vessel 30 is closed off at top by an apertured flange 34 welded or otherwise secured thereto. Flange 34 mates with the lower apertured flange 35 of a conventional gate valve 36. Threaded nuts and bolts 37 are used to removably secure flange 34 to flange 35. Valve 36 has a midportion 38 interconnecting lower flange 35 to upper flange 39. Valve 36 is externally controlled by a handwheel 40 engaging valve stem 41 operatively coupled to a valve disk 63 sealing off the interior of vessel 30.

Gate valve 36 may be a 12 inch industry standard 150 lb. working class gate valve and may be provided with a motor operator-non-rising stem, if desired.

Rack 14 is disposed on top of a scale 42 sitting on top of base 32. Scale 42, which is preferably of the cell differential pressure (DP) hydraulic load weighing type is provided on the exterior with spaced scale retrieval hooks 43, 44 for pulling up scale 42 for repair, when necessary. If an electrically actuated scale 42 is used, the apparatus 10 may include a standard outlet 45, such as a 4-20 milliamp output and a low voltage power input 46 or pressure cell which would eliminate the need for an electrical feed-through and also eliminate the need for removal of electrical equipment from the bottom of the cell. Connection 64 closes the electrical loop for the outlet 45 and input 46.

A combination clean out and electrical access line or conduit 47 extends from above surface 11, terminating in a valve 48, which may have pressure gauge associated therewith, having a lower transition section 49 at the bottom thereof thereby opening at opening 52 into the spacing below rack 14 and between vessel 30 and rack 14. Conduit 47 can thus be used for electrical access and may be made of any suitable corrosion resistant materials, such as carbon or stainless steel. Conduit 47 can also be used to suck chlorine gas out of the apparatus through valve 48 if cylinder 12 leaks during storage.

An electrical conduit 50 couples outlet 45, connection 64 and input 46 to an electrical connection interface 51 at the surface (above ground level 11). Interface 51 may be a 150 psi rated interface and may be eliminated if a hydraulic scale is used in place of scale 42. That is, suitable hydraulic cables to scale 42 and out of conduit 50 could be used in place of the electrical apparatus. Conduit 50 enters through opening 52 in cylindrical wall 33 at the bottom thereof above bottom wall 32. Conduit 50 thus couples outlet 45 and input 46 to interface 51.

A plurality of standoffs 21 (FIG. 1) may be provided at spaced locations between vessel 30 and conduit 47 to secure conduit 47 to vessel 30 and may be welded thereto.

A vacuum tube line 53 for exposing the contents of cylinder 12 to atmospheric pressure is coupled at one end to regulator 13, as at connection 54, and at the other end to aforementioned normally closed connection or nipple 27 on vessel wall 33. A quick disconnect 61 may be provided in line 53. A chlorine gas withdrawal line 56 for withdrawing gas from cylinder 12 is coupled at one end to regulator 13, as at connection 57, and at the other end to aforementioned normally closed nipple 28 on vessel wall 33. Normally closed nipple 29 on vessel wall 33 may be used as a hook-up to appropriate apparatus to register the interior of vessel 30 on a pressure gauge should the cylinder 12 burst or leak on the interior of vessel 30. This provides a fail-safe to the system. The vessel penetrations where nipples 27, 28 and 29 are may be of any appropriate type (pressure rated) to provide an interface/connection point to the outside environment or to a chlorine dispensing device.

Vessel 30 may be grouted into place. The entire assembly may be set underground. The valves may of course be reconfigured to provide access thereto. Scale 42 of course continuously monitors the weight of cylinder 12. If a leak takes place from cylinder 12 inside of vessel 30, the containment vessel 30 will go from atmospheric pressure to a pressure slightly less than inside of cylinder 12; valve 48 would detect any leakage of gas. A gauge may also be associated with nipple 29 to detect leakage. The weight of scale 42 would also decrease and be detected at interface 51.

The clearance between cylinder 12 and carriage or rack 14 may be about ½ inches. The clearance between rack 14 and vessel 30 may be about 178 inches. The minimum interior diameter of vessel 30 may be about 12¼ inches. It is preferable that vessel 30 have a minimum of 3 inches above ground (from level 11 to flanges 34, 35). However, it is only necessary to have access to valving means 36. Vessel 30 could be raised to a height above ground of up to 24 inches, if desired. The more of apparatus 11 that is underground, the less obtrusive it is and the better it is for fire protection.

Any break in the feed line 56 would be detected at regulator 13, due to a loss of vacuum, and the system would automatically shut down.

As seen in FIG. 2, rack 14 can be lifted into and out of vessel 30 by means of a chain 59 and hook 60 coupled to a remote crane or hoist (not shown). As seen, hook 60 engages bail 31. The crane or hoist, considering the parameters and dimensions given, should be rated to lift at least 500 lbs. The valve assembly 36 is of course opened in order to carry out the lifting of rack 14 out of vessel 30. Connections 61 and 62 are also disconnected from regulator 13.

The invention disclosed herein can be used to safely store 150 lb. chlorine cylinders underground. The storage apparatus incorporated with standard chlorinator devices are used to disinfect water for public water supply systems, and swimming pool facilities. The apparatus disclosed herein may also be used in small wastewater treatment plant operations and sewage lift station applications.

The containment vessel 30 is underground. This allows for the safe containment of chlorine gas because chlorine gas is 2.5 times heavier than air. Employee exposure to toxic chlorine gas is virtually eliminated due to the redundant leak detection systems, making apparatus 10 safer than conventional above ground installations. Chlorine gas feed rates, leaks and cylinder weights are monitored remotely (i.e., above ground). This adds a further measure of protection because employees do not enter the containment vessel 30.

The containment apparatus disclosed herein automatically seals when a leak is detected. The valving system or valves 36 and 48 can be used to remove the chlorine gas from the containment vessel eliminating the need for scrubbers and elaborate ventilation systems. This allows for a safe installation adjacent to residential and commercial uses.

The installation apparatus disclosed herein is nonintrusive because the majority of the containment system is stored underground. This eliminates unsightly chlorine buildings and makes retrofiting easier on sites where land is scarce.

Apparatus 10 is designed to use vacuum feed-type chlorinators. Any break in the feed lines will result in shutting off the flow of chlorine gas in the underground vessel 30. Exposure of sensitive electrical equipment and materials that can be damaged by chlorine gas is eliminated.

The chlorine cylinder 12 is stored underground in apparatus 10 eliminating exposure to sunlight. The underground storage tends to create a controlled temperature environment reducing the possibility of leaks due to fusible plugs melting. Risks of exposing the cylinder 12 to fire are virtually eliminated due to underground storage. The controlled underground environment eliminates the need of chlorine gas compartment heating particularly in locations where the ground is not subject to freezing. Individual cylinder repair kits and breathing apparatus may not be necessary at individual stations. The apparatus disclosed herein has no moving parts in normal operation. The apparatus discloses a system which meets conventional uniform fire codes applicable to chlorine gas storage without the need for subsystems or expensive costs. Although the parameters and dimensions have been given for standardized 150 lb. cylinders, obviously the dimensions and parameters may be varied to accommodate 1 ton cylinders or bulk storage containers. Also, the components of apparatus 10 may be modified to handle any corrosive or toxic compressed gas which is sold or distributed in industry standard 150 lb. or 1 ton cylinders. Finally, larger on-site storage volumes are easily accommodated by adding underground storage cylinders.

I claim:

1. Apparatus for storing a cylinder containing chlorine gas underground comprising:
   a containment vessel having a portion thereof disposed underground;
   valving means adapted to detect the presence of gas leaking out of said vessel closing off the upper end of said vessel and accessible above ground; and
   a lifting rack to contain the cylinder disposed internally of said vessel having a bail at top thereof for lifting said rack out of said vessel by pulling upwardly on said bail.

2. In the apparatus of claim 1 wherein both said vessel and said rack have a bottom wall and including a scale mounted in said vessel between the bottom wall thereof and the bottom wall of said rack, said rack resting on said scale, and weight recording means operatively connecting said scale to a monitoring panel exterior of said vessel and accessible above ground.

3. In the apparatus of claim 1 including a conduit extending from above ground downwardly underground and in communication with the bottom of said vessel.

4. In the apparatus of claim 1 including a normally closed purging outlet on said vessel opening above ground fluidly communicating the interior of said vessel with the exterior thereof and above ground.

5. In the apparatus of claim 1 a normally closed chlorine gas vacuum coupling fluidly communicating the interior of said vessel with the exterior thereof above ground.

6. In the apparatus of claim 5 including a quick disconnect line operatively connected to said vacuum coupling adapted to be coupled to a pressure regulator mounted to the top of said cylinder.

7. In the apparatus of claim 1 including a chlorine gas vent coupling fluidly communicating the interior of said vessel with the exterior thereof above ground.

8. In the apparatus of claim 7 including a quick disconnect line operatively connected to said vent coupling adapted to be coupled to a pressure regulator mounted to the top of said cylinder.

9. In the apparatus of claim 1 including a cylinder having chlorine gas under pressure mounted in said rack, said cylinder having a pressure regulator closing off the top thereof.

10. A system for storing gas underground including:
    a housing having a bottom wall, an imperforate peripheral wall and an open top;
    a valve sealing off the open top of said housing and removably connected thereto;
    a rack to support a cylinder of gas disposed internally of said housing having a bottom wall, a peripheral side wall and a bail at top, said rack also having a normally closed access door mounted on said rack;
    a scale disposed in said housing between the bottom walls of said rack and said housing;
    a conduit fluidly connecting the interior of said housing adjacent the bottom thereof with the exterior of said system and opening at an open end thereof above ground; and
    a normally closed valve operatively connected to the open end of said conduit.

11. In the system of claim 10 wherein at least the portion of said housing having said valve sealing off the open top thereof is above ground.

* * * * *